US009607630B2

(12) United States Patent
Basson et al.

(10) Patent No.: US 9,607,630 B2
(45) Date of Patent: Mar. 28, 2017

(54) PREVENTION OF UNINTENDED DISTRIBUTION OF AUDIO INFORMATION

(71) Applicant: International Business Machines Corporation, Armonk, NY (US)

(72) Inventors: Sara H. Basson, White Plains, NY (US); Dimitri Kanevsky, Ossining, NY (US); Peter K. Malkin, Yorktown Heights, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 13/863,703

(22) Filed: Apr. 16, 2013

(65) Prior Publication Data

US 2014/0309998 A1 Oct. 16, 2014

(51) Int. Cl.

| | |
|---|---|
| ***G10L 21/00*** | (2013.01) |
| ***G10L 25/00*** | (2013.01) |
| ***G10L 15/00*** | (2013.01) |
| ***G01L 17/00*** | (2006.01) |
| ***G10L 25/90*** | (2013.01) |
| ***G10L 25/51*** | (2013.01) |
| *H04R 27/00* | (2006.01) |

(52) U.S. Cl.
CPC .............. *G10L 25/00* (2013.01); *G10L 25/51* (2013.01); *H04R 27/00* (2013.01)

(58) Field of Classification Search
USPC .................................................. 704/270–275
See application file for complete search history.

(56) References Cited

U.S. PATENT DOCUMENTS

| | | | | |
|---|---|---|---|---|
| 5,008,954 | A | 4/1991 | Oppendahl | |
| 5,233,663 | A * | 8/1993 | Wood ..................... | H04R 27/00 379/391 |
| 6,690,793 | B1 | 2/2004 | King | |
| 7,142,666 | B1 * | 11/2006 | Bates ...................... | H04M 1/19 379/421 |
| 7,627,470 | B2 * | 12/2009 | Manabe et al. ............... | 704/231 |
| 7,843,486 | B1 | 11/2010 | Blair et al. | |
| 8,005,241 | B2 | 8/2011 | Rollins | |
| 8,218,751 | B2 | 7/2012 | Hepworth et al. | |
| 8,467,524 | B1 * | 6/2013 | Lee et al. ...................... | 379/421 |

(Continued)

FOREIGN PATENT DOCUMENTS

CN 101040524 A 9/2007

OTHER PUBLICATIONS

Horvitz et al., "Models of Attention in Computing and Communication: From Principles to Applications," Communications of the ACM, Mar. 2003, pp. 52-59, vol. 46, No. 3.

(Continued)

*Primary Examiner* — Olujimi Adesanya
(74) *Attorney, Agent, or Firm* — Scully, Scott, Murphy & Presser, P.C.; Alexa L. Ashworth

(57) ABSTRACT

Preventing unintended distribution of audio information may comprise analyzing audio data of a speaker's speech received by a microphone; determining automatically by a processor, from the analyzing whether the speaker's speech is intended to be distributed to an audience via the microphone; and in response to determining that the speaker's speech is not intended to be distributed to the audience via the microphone, performing one or more actions.

9 Claims, 3 Drawing Sheets

(56) References Cited

U.S. PATENT DOCUMENTS

| | | | | |
|---|---|---|---|---|
| 8,681,203 | B1 * | 3/2014 | Yin et al. | 348/14.08 |
| 8,903,721 | B1 * | 12/2014 | Cowan | 704/210 |
| 9,329,833 | B2 | 5/2016 | Swierk et al. | |
| 9,392,088 | B2 | 7/2016 | Strazisar et al. | |
| 2003/0118200 | A1 * | 6/2003 | Beaucoup | H04M 3/56 381/110 |
| 2006/0217162 | A1 * | 9/2006 | Bodley | H04B 1/38 455/575.1 |
| 2006/0229028 | A1 * | 10/2006 | Somayajula | H04M 1/6016 455/73 |
| 2007/0147644 | A1 * | 6/2007 | Bodley et al. | 381/334 |
| 2007/0237344 | A1 * | 10/2007 | Oster et al. | 381/113 |
| 2007/0291956 | A1 * | 12/2007 | Loether | 381/80 |
| 2008/0144794 | A1 * | 6/2008 | Gardner | H04L 65/403 379/202.01 |
| 2008/0221882 | A1 * | 9/2008 | Bundock et al. | 704/235 |
| 2009/0174764 | A1 | 7/2009 | Chadha et al. | |
| 2010/0067680 | A1 | 3/2010 | Hanson et al. | |
| 2010/0080382 | A1 * | 4/2010 | Dresher | H04M 1/6033 379/421 |
| 2010/0138224 | A1 * | 6/2010 | Bedingfield, Sr. | G10L 15/22 704/275 |
| 2010/0142721 | A1 * | 6/2010 | Wada et al. | 381/77 |
| 2010/0205667 | A1 * | 8/2010 | Anderson et al. | 726/19 |
| 2010/0232632 | A1 * | 9/2010 | Kindred | H04M 1/72591 381/315 |
| 2011/0054647 | A1 * | 3/2011 | Chipchase | H04M 3/42127 700/94 |
| 2011/0196519 | A1 * | 8/2011 | Khoury et al. | 700/94 |
| 2011/0319128 | A1 | 12/2011 | Miwa | |
| 2012/0063587 | A1 * | 3/2012 | Michaelis | H04M 1/253 379/387.02 |
| 2012/0140944 | A1 | 6/2012 | Thiele | |
| 2012/0166184 | A1 * | 6/2012 | Locker | G10L 15/22 704/201 |
| 2012/0224714 | A1 * | 9/2012 | Couse | H04R 1/406 381/92 |
| 2013/0010984 | A1 * | 1/2013 | Hejnicki | 381/107 |
| 2013/0249699 | A1 * | 9/2013 | Liu | H04M 1/19 340/654 |
| 2013/0321156 | A1 * | 12/2013 | Liu | 340/573.1 |

OTHER PUBLICATIONS

Trancoso et al., "Building Spoken Language Systems," Proc. ConfTele, 2005.

Moran et al., "Multimodal User Interfaces in the Open Agent Architecture," Knowledge-Based . . . , Elsevier, 1998.

Traum, "Rhetorical Relations, Action and Intentionality in Conversation," Proceedings ACL SIG Workshop on Intentionality and Structure in Discourse Relations, Jun. 1993, pp. 132-135.

Office Action dated Jun. 7, 2016, received in U.S. Appl. No. 13/966,805, 24 pages.

Office Action dated Sep. 15, 2016, received in U.S. Appl. No. 13/966,805, 29 pages.

Notice of Allowance dated Jan. 25, 2017, received in U.S. Appl. No. 13/966,805, 23 pages.

* cited by examiner

PREVENTION OF UNINTENDED DISTRIBUTION OF AUDIO INFORMATION

FIELD

The present application relates generally to computers, computer devices and applications, e.g., pertaining to multimedia systems, and more particularly to preventing unknown distribution over a microphone.

BACKGROUND

Speaker devices are often connected with microphones in public scenarios in order to amplify their voices for transmission or distribution to large groups of people or in large arenas. Microphones can be handheld, podium placed, or connected via lapel. There are many known instances where speakers forget that they have microphones that are amplifying their speech, and continue to speak in ostensibly private conversations where their speech continues to be amplified to a broader audience. In other cases, the original speaker that was using the microphone is no longer present, and other speakers—not aware of the amplification system—have come to the podium or area where microphones are active. They may be engaged in "private" conversations that are inadvertently being amplified to a larger audience. This leads to potentially embarrassing situations. These problems can arise with all types of microphones, and in all types of meetings—lectures, or public speeches.

Many conference call systems and speaker phones have the capability to announce periodically that the system has been in use for an extended period of time, and to ask the user to confirm by pressing a button their continuing need to have the conference call "open." This is only partially efficient. First, it occurs only during certain time intervals, and during the intervening time there might be unintended participants in the room. For example, the individuals that set up the conference call might have concluded, but left the conference room without formally disconnecting the conference call. A new set of individuals may have entered the conference room and may be speaking, unaware that the conference call is "on" and that their "side comments" are being transmitted or distributed to others that may still be on the conference call. Second, in some cases it is not easy for the caller to confirm via key press that he is or is not interested in continuing the conference call; for example if the caller is in a hands-busy situation, such as driving. Third, in cases where the speakers are interested in continuing the conference call, a query to press a button to continue the conference call can be intrusive and disturbing.

Existing systems may provide visual indications that conference phones are active, for example, by displaying a green light. Existing systems may also provide visual indications for microphones as well, with, for example, a red light indicating that the microphone is "active." The frequency of these signals being ignored by users, however, indicates that the existing solutions are not successfully providing speakers with the cues that they need.

BRIEF SUMMARY

A method of preventing unintended distribution of audio information, in one aspect, may comprise analyzing audio data of a speaker's speech received by a microphone. The method may also comprise determining automatically from the analyzing, whether the speaker's speech is intended to be distributed to an audience via the microphone. The method may further comprise, in response to determining that the speaker's speech is not intended to be distributed to the audience via the microphone, performing one or more actions.

A system for preventing unintended distribution of audio information, in one aspect, may comprise a microphone, and a processor operable to analyze audio data of a speaker's speech received by the microphone. The processor may be further operable to determine automatically whether the speaker's speech is intended to be distributed to an audience via the microphone, and in response to determining that the speaker's speech is not intended to be distributed to the audience via the microphone, the processor may be further operable to perform one or more actions.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, a system and a method may be provided that may prevent unwanted distribution or transmission of speech by an unaware speaker. For example, a microphone may be muted, a speaker may be notified that a microphone is still on or that the speaker's comment is being amplified, for instance, based on one or more conditions in the environment surrounding the speaker.

As an example, a speaker may forget that a microphone is turned on and begin having a private conversation that the speaker does not realize is being distributed or transmitted to a not-directed audience. In these cases, there is no known system that is able to automatically mute or alert the speaker to such conditions. The system and the method may provide a number of aspects for analyzing the qualities about a speaker's speech to determine if the speaker is intentionally or unintentionally speaking into the microphone. The qualities to be detected may include (1) harmonics of the speech (voice quality), (2) content of the speech (topic change), and/or (3) manner of the speech (e.g., ums, hmmms, and uhs in the speech).

Figure 1:
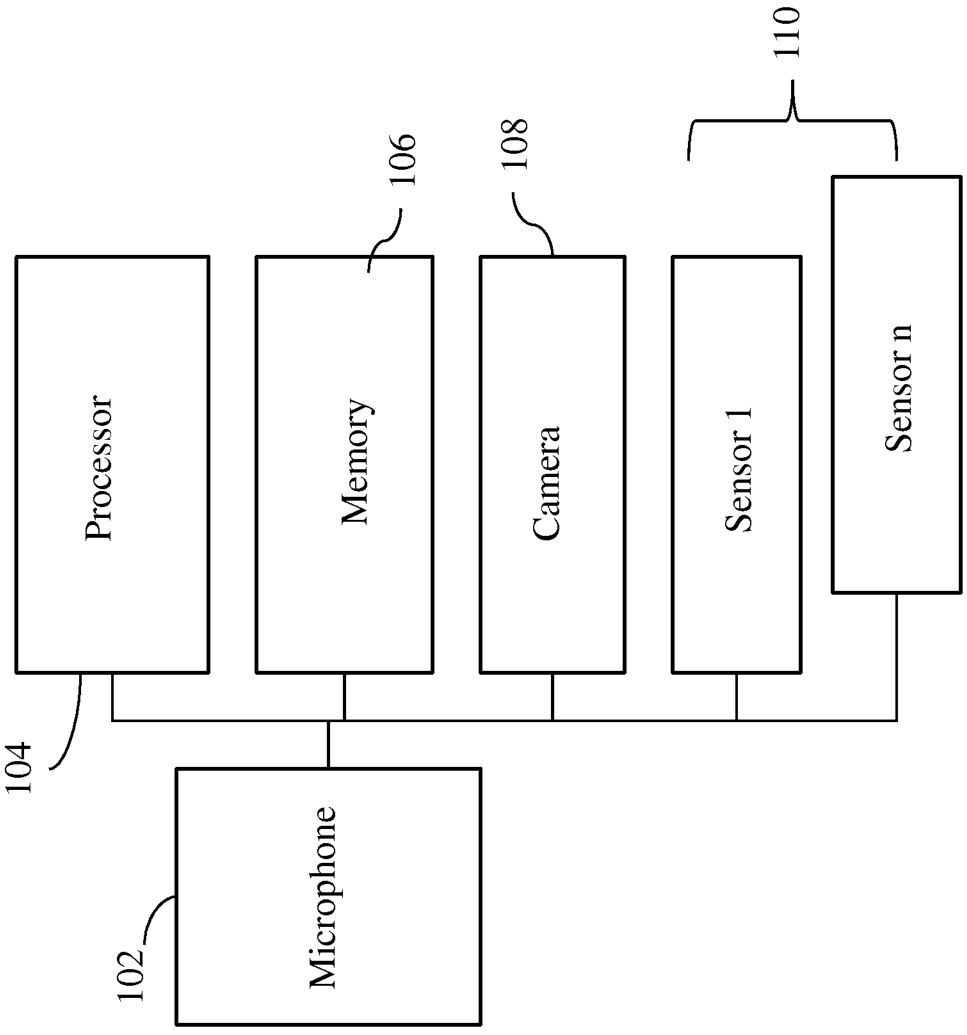
FIG. 1 is a diagram illustrating system components in one embodiment of the present disclosure.

FIG. 1 is a diagram illustrating components of a system in one embodiment of the present disclosure. In one embodiment, an intelligent microphone 102 may be provided that is able to process surrounding audio and video information to understand a speaker's intentions and the likely audience for the speaker's speech, and then provide speaker/s more effective feedback to prevent him/her/them from using microphones or speaking into speaker phones or conference calls inadvertently. The intelligent microphone 102 of the present disclosure may comprise an integrated circuit or hardware processor 104 programmed to execute the methods described herein to determine whether or not the speech is intended to be made into the microphone 102. The intelligent microphone 102 may also include memory 106, e.g., for storing data. In another aspect, the intelligent microphone 102 may also include a camera 108 and/or one or more other sensors 110.

A number of methods are provided in the present disclosure for using the audio and/or other information to detect that a speaker does not intend to speak into the microphone or to distribute via the microphone, e.g., on a conference call device or another like device. For example, changes in speaker volume may be detected and used as a criterion that a speaker does not intend the speech to be distributed. For instance, when speakers intend their speech for private audiences, they might speak in a lower voice or even a whisper. As another example, changes in voice harmonics may be detected and used as an indication that a speaker does not intend the speech to be distributed. For instance, there are voice quality differences when a person speaks in a "public" voice vs. in a private manner. As yet another example, changes in the content of the person's speech may be detected and used as an indication that the person does not intend to distribute the speech. For example, an enterprise employee speaks about a company's strategy and suddenly changes the topic when he turns to someone to speak "privately." Still yet, changes in a speaking manner such as fluency may be detected. For example, some speakers may have disfluencies when speaking publicly, using filler words such as "hmm" and "uh." Such filler words can disappear when the speaker is more relaxed and speaking privately and extemporaneously. The opposite can also be the case, as a public speaker can be polished and rehearsed and speak fluently. When the speaker is "off script," the speaker may have more word finding difficulty and filler words. Occurrence of such filler words in a speech may be detected and used in context with other factors to determine whether or not the speech is intended to be distributed. For example, filler words occurring in quieter voice may indicate a private conversation; filler words detected in more formal manner of speech and louder voice may indicate that the speech is intended to be distributed.

Visual information can be extracted, e.g., using a camera (e.g., 108) to assess whether the speaker's environment has changed, and whether therefore he/she may not intend to be speaking to a larger audience. Examples of such visual information may include, but are not limited to, detecting changes in the distance between a speaker and a microphone (sometimes a speaker moves farther away from a microphone if he intends to speak in private); detecting changes in location (e.g., a speaker with a lapel microphone has moved to another room); detecting situational changes, such as people in the auditorium are leaving, or new people (e.g., family members) have entered the room where speakers are located; a president was at the podium and now the president is bending over a table.

Information also can be extracted via one or more other sensors 110. For example, one can use a motion sensor or infra rays to detect how far speakers are from a mike or where they are located.

Feedback may be provided to speakers, e.g., on their microphones, for example, in the following ways: visual signals (e.g., strong), e.g., a flashing lamp; tactile signals such as vibration to the speaker; audio signals such as beeps; other audio signals, e.g., echoing back to the speaker in quiet audio or in different harmonics when users are speaking, so that they learn to "feel" from audio feedback that their microphone is on (e.g., in the way that some typists learn from sounds whether they have clicked a correct key); automatically muting a microphone and/or asking a speaker to confirm that the speaker intended his voice to continue to be amplified.

Feedback may be provided via speech recognition and natural language understanding. For example, one can use speech recognition and natural language understanding to understand the content of speech. Speech that is being amplified can be transcribed through speech recognition. A continued display of transcribed speech can clue the speaker that the microphone is on.

Additional non-speech information may provide clues that the microphone or conference call should be turned off. For example, calendar information can indicate that a given speech or conference call was scheduled to end at a particular time, and that can be a signal to cue the speaker as to whether they want to continue to have their speech distributed.

All of the methods noted for detecting when a microphone should be turned off or whether a user should be signaled that a microphone/conference call are still active can be integrated and used to increase the confidence score that the system is correctly interpreting the situation.

Figure 2:
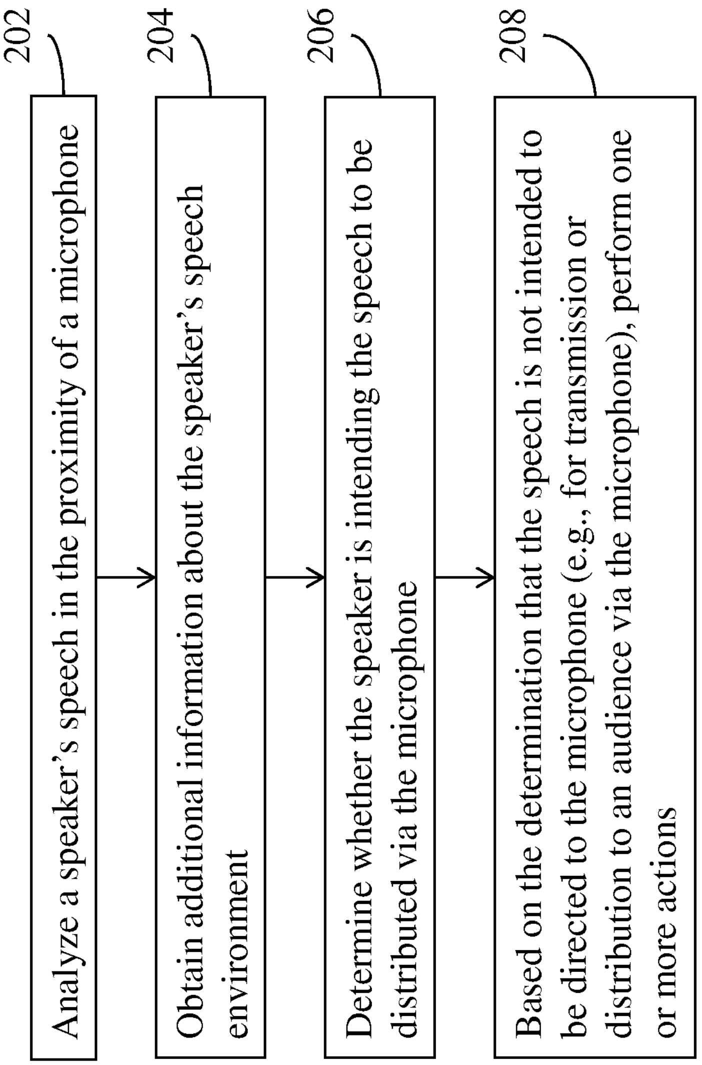
FIG. 2 illustrates a method for preventing unintended use of a microphone in one embodiment of the present disclosure.

FIG. 2 illustrates a method for preventing unintended distribution of audio information in one embodiment of the present disclosure. At 202, a speaker's speech in the proximity of a microphone is analyzed. For instance, the speaker's speech received by a microphone is analyzed before it is amplified and/or distributed to an audience. The speaker's speech may be considered to be in the proximity of a microphone, for instance, if the speaker's voice can be detected by the microphone. In addition to analyzing the speech, additional information may be obtained at 204 of the speaker's speech environment, for example, using a camera that can collect visual cues, or one or more sensors that may provide additional information about the speech being made with the microphone.

At 206, the information from the analyzed speech, and any other additional information may be used to determine whether the speaker is intending the speech to be made into the microphone and distributed. So, for example, audio data, video data and/or other sensor data may be analyzed for determining whether the speech is meant to be spoken into the microphone. The analysis of audio data may include detecting changes in speaker voice volume, harmonics, a manner of speech, and/or sudden change in topic, and/or other cues. The analysis of visual information may include detecting changes in distance, changes in location, and other changes in the surrounding area. Thus, as described above, for example, a detected change in voice volume of the speaker, change in harmonics, the manner of speech and/or a sudden change in topic, and/or other cues may provide a determination that the speech is not intended to be spoken into the microphone.

At 208, based on the determination that the speech is not intended to be directed to the microphone (e.g., for distribution or transmission via the microphone to an audience), one or more actions may be triggered. An example of an action is providing a feedback to the speaker. Another example of an action is muting or turning off the microphone automatically. The feedback may include visual clues and/or audio clues. An example of a microphone is one that is attached to a teleconference system. The methodology of the present disclosure may apply to any other microphones.

Figure 3:
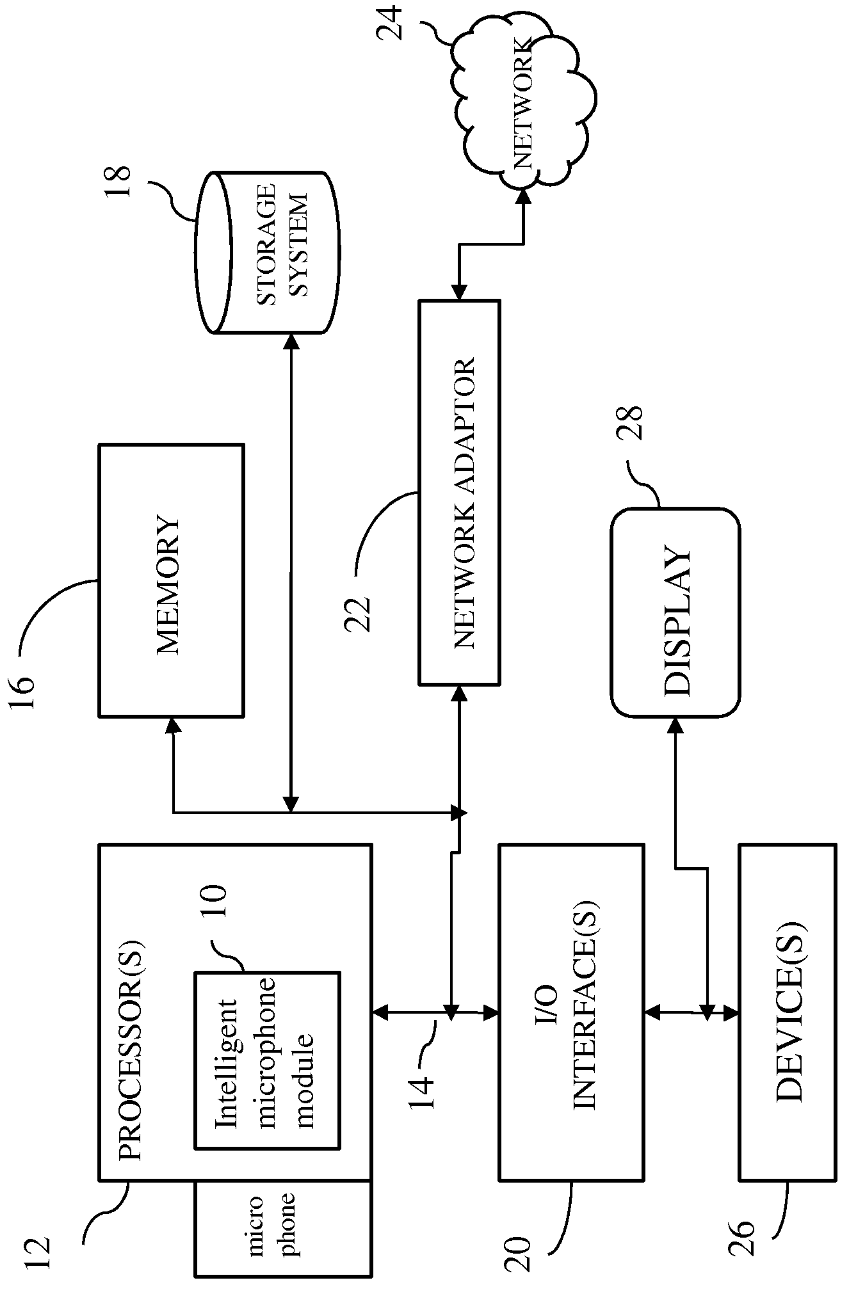
FIG. 3 illustrates a schematic of an example computer or processing system that may implement an intelligent microphone system in one embodiment of the present disclosure.

FIG. 3 illustrates a schematic of an example computer or processing system that may implement an intelligent microphone system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an intelligent microphone module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of preventing unintended distribution of audio information, comprising:

analyzing, by a processor, audio data of a speaker's speech received by a microphone before the audio data is distributed via the microphone;

determining automatically, by the processor, from the analyzing whether the speaker's speech is intended to be distributed to an audience via the microphone; and in response to determining that the speaker's speech is not intended to be distributed to the audience via the microphone, performing one or more actions, wherein the analyzing comprises at least detecting a change in a manner of the speaker's speech comprising at least a change in harmonics of the speech, and based on the detecting of the change, determining that the speaker's speech is not intended to be distributed to the audience via the microphone, wherein one or more actions comprises at least generating a signal automatically by the processor that indicates the microphone is turned on, the signal comprising echoing back to the speaker in different harmonics while the speaker is speaking, and turning off the microphone automatically, wherein the analyzing further comprises detecting a change in a voice volume of a speaker making the speech, a change in a topic of the speech, the method further comprising collecting visual cues comprising a change in distance between a speaker making the speech and the microphone, a change in location from where the speaker is making the speech, the audience entering into and exiting from the location, the detected change in the voice volume, the change in the topic of the speech, and the visual cues increasing a confidence score in determining to turn off the microphone.

2. The method of claim 1, wherein the analyzing comprises detecting a change in a voice volume of a speaker making the speech, a change in a manner of the speech, a change in a topic of the speech, or combinations thereof.

3. The method of claim 1, further comprising collecting visual cues and the visual cues are also used to determine whether the speaker's speech is intended to be distributed.

4. The method of claim 3, wherein the visual cues comprises a change in distance between a speaker making the speech and the microphone, a change in location from where the speaker is making the speech, or combinations thereof.

5. The method of claim 1, further comprising collecting motion data associated with a speaker making the speech, and further using the motion data to determine whether the speaker's speech is intended to be distributed.

6. The method of claim 1, wherein the one or more actions comprises providing a feedback to the speaker, muting the microphone, turning off the microphone, or combinations thereof.

7. The method of claim 6, wherein the feedback comprises one or more of flashing lamp, tactile signal, audio signal, a transcription of the speech on a display, or combinations thereof.

8. The method of claim 1, further comprising analyzing non-speech information to determine whether the speaker's speech is intended to be distributed.

9. The method of claim 1, wherein the detecting of the change in the manner of the speaker's speech further comprises detecting an absence or presence of a filler word in the speaker's speech.

* * * * *